United States Patent
Almuhammadi et al.

(10) Patent No.: US 10,722,984 B2
(45) Date of Patent: Jul. 28, 2020

(54) PREPARATION OF ELECTRODES ON CFRP COMPOSITES WITH LOW CONTACT RESISTANCE COMPRISING LASER-BASED SURFACE PRE-TREATMENT

(71) Applicants: KING ABDULLAH UNIVERSITY OF SCIENCE AND TECHNOLOGY, Thuwal (SA); SAUDI ARABIAN OIL COMPANY, Dhahran (SA); SAUDI ARABIAN OIL COMPANY ARAMCO R&D, Dhahran (SA)

(72) Inventors: Khaled Hamdan Almuhammadi, Thuwal (SA); Gilles Henri Fernand Lubineau, Thuwal (SA); Marco Francesco Alfano, Thuwal (SA); Ulrich Buttner, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 318 days.

(21) Appl. No.: 15/576,586

(22) PCT Filed: Jun. 24, 2016

(86) PCT No.: PCT/IB2016/053781
§ 371 (c)(1),
(2) Date: Nov. 22, 2017

(87) PCT Pub. No.: WO2016/207852
PCT Pub. Date: Dec. 29, 2016

(65) Prior Publication Data
US 2018/0169794 A1    Jun. 21, 2018

Related U.S. Application Data

(60) Provisional application No. 62/184,326, filed on Jun. 25, 2015.

(51) Int. Cl.
*B23K 26/60* (2014.01)
*G01N 1/44* (2006.01)
(Continued)

(52) U.S. Cl.
CPC .............. *B23K 26/60* (2015.10); *B23K 26/20* (2013.01); *G01N 1/44* (2013.01); *G01N 21/65* (2013.01);
(Continued)

(58) Field of Classification Search
CPC ...... B23K 26/60; B23K 26/20; B23K 26/352; G01N 1/44; G01N 21/65; G01N 27/026; G01N 27/041; G01N 2001/045
See application file for complete search history.

(56) References Cited

U.S. PATENT DOCUMENTS

| | | | | |
|---|---|---|---|---|
| 8,749,778 B2 * | 6/2014 | Miyaji | ................ | G01N 21/65 |
| | | | | 136/263 |
| 8,987,632 B2 * | 3/2015 | Wohl, Jr. | ................ | B32B 38/10 |
| | | | | 219/121.69 |

(Continued)

OTHER PUBLICATIONS

Telschow, K., et al.; "Fatigue Damage Evaluation in CFRP Woven Fabric Composites Through Dynamic Modulus Measurements"; Idaho National Engineering and Environmental Laboratory, ASME PVP 2004 International Conference, Jul. 25-29, 2004; 7 pp.; California, USA.

(Continued)

*Primary Examiner* — Nicholas J. Weiss
(74) *Attorney, Agent, or Firm* — Patent Portfolio Builders PLLC

(57) ABSTRACT

Various examples are provided related to the preparation of electrodes on carbon fiber reinforced polymer (CFRP) composites with low contact resistance. Laser-based surface preparation can be used for bonding to CFRP composites. In one example, a method includes preparing a pretreated target (Continued)

area on a CFRP composite surface using laser pulsed irradiation and bonding an electrode to exposed fibers in the pretreated target area. The surface preparation can allow the electrode to have a low contact resistance with the CFRP composite.

19 Claims, 10 Drawing Sheets

(51) Int. Cl.
    *G01N 27/02*     (2006.01)
    *B23K 26/20*     (2014.01)
    *G01N 21/65*     (2006.01)
    *G01N 27/04*     (2006.01)
    *G01N 1/04*     (2006.01)
    *B23K 26/352*     (2014.01)

(52) U.S. Cl.
    CPC .......... *G01N 27/026* (2013.01); *B23K 26/352* (2015.10); *G01N 27/041* (2013.01); *G01N 2001/045* (2013.01)

(56) References Cited

U.S. PATENT DOCUMENTS

2011/0086204 A1    4/2011    Wohl et al.
2018/0372664 A1*  12/2018  Buttner ................ B23K 26/362

OTHER PUBLICATIONS

Todoroki, A., et al.; "Fatigue damage detection of CFRP using the electrical resistance change method"; International Journal of Aeronautical and Space Sciences 14(4); Nov. 2013; pp. 350-355.
Todoroki, A., et al.; "Strain and Damage Monitoring of CFRP Laminates by Means of Electrical Resistance Measurement"; Journal of Solid Mechanics and Materials Engineering, vol. 1 No. 8; Mar. 13, 2007; pp. 947-974.
Toroki, A.; et al.; "2014. Electrical resistance change of carbon/ epoxy composite laminates under cyclic loading under damage initiation limit"; Open Journal of Composite Materials No. 4, Jan. 2014; pp. 22-31.
Toscano, C., et al.; "Lockin thermography to monitor propagation of delamination in CFRPcomposites during compression tests"; 11th International Conference on Quantitative InfraRed Thermography; 2012; pp. 8; Naples, Italy.
Alfano, M., et al.; "Influence of Laser Surface Modification on Bonding Strength of Al/Mg Adhesive Joints"; Journal of Adhesion Science and Technology 25; 2011; pp. 1261-1276.
Alfano, M., et al.; "Surface Patterning of Metal Substrates Through Low Power Laser Ablation for Enhanced Adhesive Bonding"; The Journal of Adhesion 90, 2014; pp. 384-400.
Angelidis, N., et al."The electrical resistance response of continuous carbon fiber composite laminates to mechanical strain"; Composites Part A 35: Applied Science and Manufacturing, Mar. 2004; pp. 1135-1147.
Aymerich, et al.; "Ultrasonic evaluation of matrix damage in impacted composite laminates"; Composites: Part B: engineering; 31, 2006; pp. 1-6.
Ayres, F., et al.; "Qualitative impedance-based health monitoring of civil infrastructures"; Smart Materials and Structures 7, 1998, pp. 599-605.
Barsoukov, E., et al.; "Impedance Spectroscopy: Theory, Experiment, and Applications"; Wiley-Interscience, Second Edition; 2005; 606 pp.
Benard, Q., et al.; "Surface treatment of carbon/epoxy and glass/ epoxy composites with an excimer laser beam"; International Journal of Adhesion and Adhesives 26, Oct. 6, 2005; pp. 543-549.

Bera, T. K.; "Bioelectrical Impedance Methods for Noninvasive Health Monitoring: A Review"; Journal of Medical Engineering; Jun. 17, 2014; pp. 1-29.
Bieda, M., et al.; "Ultra-Low Friction on 100Cr6-Steel Surfaces After Direct Laser Interference Patterning"; Advanced Engineering Materials 17, No. 1; 2015; pp. 102-108.
Boinard, P. et al.; "Non destructive evaluation of adhesively bonded composite structures using high frequency dielectric spectroscopy"; Journal of Materials Science 35, 2000; pp. 1331-1337.
Boller, C., et al.; "Health monitoring of Aerospace Structures, Smart Sensor Technologies and Signal Processing" John Wiley and Sons, Ltd.; 2004; pp. 1-280.
Borsic, A.; "Regularisation methods for imaging from electrical measurements"; Ph.D. thesis, Oxford Brookes University; Jul. 2002.
Bunsell, A.R.; "The Monitoring of Damage of Carbon Fibre Composite Structures by Acoustic Emission"; 1983; pp. 1-20.
Ciang, C. C., et al.; "Structural health monitoring for a wind turbine system: a review of damage detection methods"; Measurement Science and Technology 19; Oct. 13, 2008; 20 pp.
Davis, G. D.; "Evaluating Adhesive Bonds with Carbon-Composites Using Electrochemical Impedance Spectroscopy"; Abstract #1766, 224th ECS Meeting, The Electronchemical Society; 2013; pp. 1.
DeRosa, I. M., et al.; "Acoustic emission for monitoring the mechanical behaviour of natural fibre composites: a literature review"; Composites Part A, 40, Apr. 30, 2009; pp. 1456-1469.
Garrison, B., et al.; "Laser ablation of organic polymers: Microscopic models for photochemical and thermal processes."; Journal of Applied Physics 57(8); Apr. 15, 1985; pp. 2909-2914.
Holder, D.S.; "Electrical impedance tomography: methods, history and applications"; Dec. 21, 2004; pp. 1-61.
Kang, J., et al.; "Inkjet printed electronics using copper nanoparticle ink"; Journal of Materials Science: Materials in Electronics 21; 2010; pp. 1213-1220.
Kim, H.S., et al.; "Intense pulsed light sintering of copper nanoink for printed electronics"; Applied Physics A, Materials, Science & Processing, No. 97, pp. 791-798.
Li, H.N., et al.; "Recent applications of fiber optic sensors to health monitoring in civil engineering"; Engineering structures 26, May 18, 2004; pp. 1647-1657.
Lima, M., et al.; "Laser processing of carbon fiber reinforced polymer composite for optical fiber guidelines"; Physics Procedia 41; 2013; pp. 572-580.
Lubineau, G., et al.; "On micro-mesa relations homogenizing electrical properties of transversely cracked laminated composites."; Composite Structures 105, May 11, 2013; pp. 66-74.
MacDonald, J. R.; "Impedance spectroscopy"; Annals of Biomedical Engineering, vol. 20; 1992; pp. 289-305.
Maierhofer, C., et al,.; "Characterizing damage in CFRP structures using flash thermography in reflection and transmission configurations. "; Composites: Part B 57; pp. 35-46.
Mathew, J. et al.; "Parametric studies on pulsed Nd:YAG laser cutting of carbon fiber reinforced plastic composites"; Journal of Materials Processing Technology, 89-90; 1999; pp. 198-203.
Meola, C., et al.; "Non destructive evaluation of impact damage in CFRP with infrared thermography and squid"; pp. 1-4.
Metherall, D., et al.; "Three-dimensional electrical impedance tomography";Letters To Nature, vol. 380; Apr. 11, 1996; pp. 509-512.
Mounkaila, M., et al.; "Cure Monitoring of Composite Carbon/ Epoxy through Electrical Impedance Analysis,"; Second European Conference of the Prognostics and Health Management Society; 2014; pp. 1-4; Nantes, France.
Negerestani, R., et al.; "Numerical simulation of laser machining of carbon-fibre-reinforced composites"; Proceedings of the Institution of Mechanical Engineers , vol. 224, Part B: Journal of Engineering Manufacture; 2010; pp. 1017-1027.
Ng, C., et al.; "A lamb-wave-based technique for damage detection in composite laminates"; Smart Materials and Structures 18; Jun. 15, 2009; pp. 1-12.
Nixdorf, K., et al.; "Electrical Impedance Spectroscopy for Cure Monitoring and Damage Detection in Model Adaptive Compo-

(56) References Cited

OTHER PUBLICATIONS nents"; Euromech 373 Colloquium on Modeling and Control of Adaptive Mechanical Structures, 1998; pp. 79-88; Magdeburg, Germany.
Perez, M.; et al.; "Non-destructive testing evaluation of low velocity impact damage in carbon fiber reinforced laminated composites"; Ultragarsas (Ultrasound) vol. 66, No. 2; 2011; pp. 21-27.
Perrissin-Fabert, Y., et al.; "Simulated and experimental study of the electric impedance of a piezoelectric element in a viscoelastic medium"; Ultrasonics vol. 32, No. 2; 1994; pp. 107- 112.
Pohl, J., et al.; "Damage detection in smart cfrp compos ites using impedance spectroscopy"; Smart Materials and Structures 10; Aug. 7, 2001; pp. 834-842.
Polydorides, N.; "Image Reconstruction Algorithms for Soft-Field Tomograpy"; Thesis, University of Manchester Institute of Science and Technology; 2002; pp. 1-264.
Qi, Biao., "Sanding, grit blasting and plasma etching: effect on surface composition and surface energy of graphite/epoxy composites"; Master's thesis. University of Cincinnati; May 29, 2009; pp. 1-161.
Ramanan, S., et al.; "Quantitative Nondestructive Evaluation of CFRP Components by Sampling Phased Array"; 2nd International Symposium on NDT in Aerospace,; 2010; pp. 109; Germany.
Ramoli, L., et al.; "A study on UV laser drilling of PEEK reinforced with carbon fibers"; Optics and Lasers in Engineering 50; Nov. 5, 2011; pp. 449-457.
Roch, T., et al.; "Direct Laser Interference Patterning of tetrahedral amorphous carbon films for tribological applications"; Diamond and Related Materials 33; Dec. 12, 2012; pp. 20-26.
Sbarbaro, D., et al.; "State estimation and inverse problems in electrical impedance tomography: observability, convergence and regularization"; Inverse Problems 31; Mar. 10, 2015; pp. 1-28.
Scarponi, G.et al.; "Ultrasonic technique for the evaluation of delaminations on CFRP, GFRP, KFRP composite materials"; Composites: Part B: Engineering 31; Aug. 23, 1999; pp. 237-243.
Schueler, R., et al.; "Damage detection in CFRP by electrical conductivity mapping"; Composites Science and Technology 61, Jul. 2000; pp. 921-930.
Schulte, K., et al.; "Load and Failure Analyses of CFRP Laminates by Means of Electrical Resistivity Measurements"; Composites Science and Technology 36; 1989; pp. 63-76.
Selvakumaran, L., et al.; "On the detectability of transverse cracks in laminated composites using electrical potential change measurements"; Composite Structures 121; Nov. 14, 2014; pp. 237-246.
Selvakumaran, L., et al.; "Electrical behavior of laminated composites with intralaminar degradation: A comprehensive micro-meso homogenization procedure"; Composite Structures 109, Nov. 8, 2013; pp. 178-188.
Slipher, G., et al.; "Chapter 1: Electrical Impedance Spectroscopy for Structural Health Monitoring"; Experimental and Applied Mechanics, vol. 6, Proceedings of the 2014 Annual Conference on Experimental and Applied Mechanics; 2014; pp. 1-202.
Srinivasan, R., et al.; "Ultraviolet Laser Ablation of Organic Polymers"; Chemical Reviews 89; 1989; pp. 1303-1316.
Su, Z., et al.; "Guided lamb waves for identification of damage in composite structures: A review"; Journal of Sound and Vibration 295; Mar. 20, 2006; pp. 753-780.
Tagliaferri, V., et al.; "Laser cutting of fiber-reinforced polyesters"; Composites vol. 16, No. 4; Oct. 1985; pp. 317-325.
Almuhammadi, K., et al., "Laser-Based Surface Preparation of Composite Laminates Leads to Improved Electrodes for Electrical Measurements," Applied Surface Science, Oct. 19, 2015, vol. 359, pp. 388-397.
Fischer, F., et al., "Laser Surface Pre-Treatment of CFRP for Adhesive Bonding in Consideration of the Absorption Behaviour," The Journal of Adhesion, Apr. 25, 2012, vol. 88, No. 4-6, pp. 350-363.
Fischer, F., et al., "Surface Structuring of CFRP by Using Modern Excimer Laser Sources," Physics Procedia, Dec. 2012, vol. 39, pp. 154-160.
International Search Report in related International Application No. PCT/IB2016/053781, dated Sep. 21, 2016.
Jeon, E.-B., et al., "An Investigation of Contact Resistance Between Carbon Fiber/Epoxy Composite Laminate and Printed Silver Electrode for Damage Monitoring," Composites: Part A, Applied Science and Manufacturing, Aug. 10, 2014, vol. 66, pp. 193-200.
Todoroki, A., et al., "Durability Estimates of Copper Plated Electrodes for Self-sensing CFRP Composites,", Journal of Solid Mechanics and Materials Engineering, Jun. 30, 2010, vol. 4, No. 6, pp. 610-620.
Written Opinion of the International Searching Authority in related International Application No. PCT/IB2016/053781, dated Sep. 21, 2016.
Communication pursuant to Article 94(3) EPC in corresponding/related European Application No. 16738871.9, dated Jun. 19, 2019.

\* cited by examiner

PREPARATION OF ELECTRODES ON CFRP COMPOSITES WITH LOW CONTACT RESISTANCE COMPRISING LASER-BASED SURFACE PRE-TREATMENT

CROSS REFERENCE TO RELATED APPLICATIONS

This application is a continuation of International Application No. PCT/IB2016/053781, filed on Jun. 24, 2016, which claims priority to, and the benefit of, co pending U.S. provisional application entitled "Method of preparation of electrodes on CFRP composites with low contact resistance" having Ser. No. 62/184,326, filed Jun. 25, 2015, which are hereby incorporated by reference in their entirety.

BACKGROUND

In recent times the use of modern composite materials is becoming increasingly widespread. However, the failure modes of composite structures are extremely complex and, unlike metals, they may suffer significant degradation with barely visible surface damage. Since the damage may cause serious decrease in material strength and lead to catastrophic failure, the development of reliable structural health monitoring (SHM) techniques can have a tremendous impact on the life-cycle cost spent for inspection and repair.

As a result, a number of nondestructive evaluation techniques have been put forward, including dielectric spectroscopy, ultrasonic evaluation, vibration analysis, phased array analysis, shearography, thermography, infrared thermography, ultrasonic phased array, sampling phased array (SPA), synthetic aperture focusing technique (SAFT), flash thermography, dynamic modulus measurements, and acoustic emission monitoring.

SUMMARY

Embodiments of the present disclosure are related to the preparation of electrodes on carbon fiber reinforced polymer (CFRP) composites with low contact resistance. In one embodiment, among others, a method comprises preparing a pretreated target area on a carbon fiber reinforced polymer (CFRP) composite surface using laser pulsed irradiation; and bonding an electrode to exposed fibers in the pretreated target area. In one or more aspects of these embodiments, the electrode exhibits a low contact resistance with the CFRP composite. The electrode can have a contact resistance of about 0.1 ohms or less. The electrode can exhibit a uniform bonding over the pretreated target area.

In one or more aspects of these embodiments, the method can comprise preparing a plurality of pretreatment target areas on the CFRP composite surface using laser pulsed irradiation; and bonding a plurality of electrodes to corresponding ones of the plurality of pretreatment target areas. Individual electrodes of the plurality of electrodes can have a contact resistance of about 0.1 ohms or less. The plurality of electrodes can exhibit an average contact resistance of about 0.07 ohms or less. The plurality of electrodes can exhibit a repeatable contact resistance. Variation of the contact resistance of the plurality of electrodes can be about ±0.01 ohm or less. In one or more aspects of these embodiments, about 75% or more of exposed carbon fibers in the pretreated target area of the CRFP composite can be fully exposed by the laser pulsed irradiation. Exposure of the carbon fibers can be evaluated using Raman mapping of the pretreated target area. The electrode can be mechanically interlocked with fully exposed fibers in the pretreated target area during bonding.

In one or more aspects of these embodiments, bonding the electrode can comprise applying silver paste to the pretreated target area. The method can comprise positioning the CFRP composite surface for pretreatment of a target area of the CFRP surface; preparing the pretreated target area by irradiation with a pulsed laser along a series of paths in the target area; and bonding the electrode to exposed carbon fiber in the pretreated target area. The series of paths can be a plurality of parallel paths. The pulsed laser can have a focused beam diameter ($d_s$) of 25 μm on the CFRP surface. The series of paths can have a minimum line spacing (p) of 30 μm. The pulsed laser can have a frequency (f) of 30 kHz and can traverse the series of paths at a scanning speed (v) of less than or equal to 500 mm/second, and with an average power ($P_{ave}$) of the laser that can be less than or equal to 30 Watts.

In one or more aspects of these embodiments, the scanning speed (v) can be less than 100 mm/second and the average power ($P_{ave}$) of the laser can be equal to or less than 7.5 Watts. The scanning speed (v) can be equal to or greater than 50 mm/second and the average power ($P_{ave}$) of the laser can be greater than 4.5 Watts. The average power ($P_{ave}$) of the laser can be greater than 6.75 Watts when the scanning speed (v) is greater than 75 mm/second and the average power ($P_{ave}$) of the laser can be equal to or less than 6.75 Watts when the scanning speed (v) is equal to or less than 75 mm/second. The average power ($P_{ave}$) of the laser can be greater than 5.25 Watts when the scanning speed (v) is equal to or greater than 60 mm/second. A pulse duration ($\tau_p$) of the pulsed laser can be greater or equal to 10 nanoseconds.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
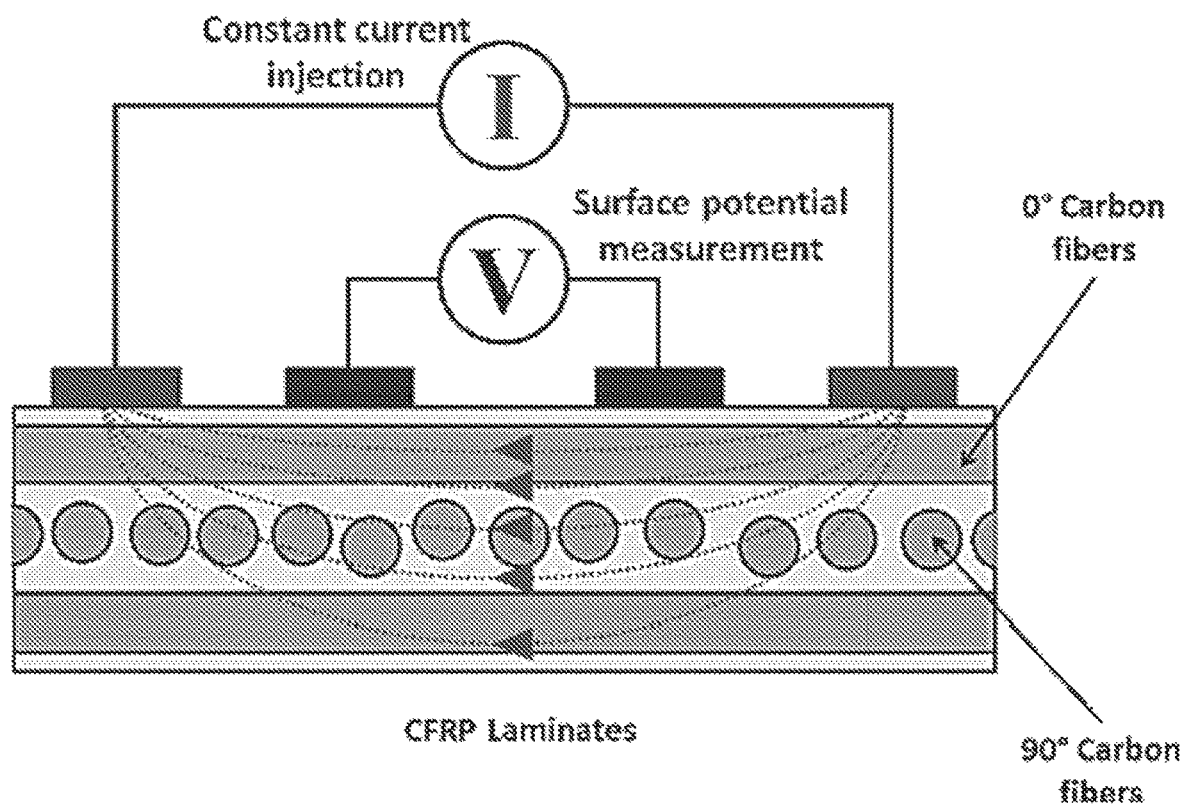
FIGS. 1A and 1B are schematic diagrams illustrating examples of electrical resistance change method (ERCM) and electrical impedance spectroscopy (EIS), respectively, for composite characterization, in accordance with various embodiments of the present disclosure.

Disclosed herein are various examples related to laser-based surface preparation for bonding to carbon fiber reinforced polymer composites. Reference will now be made in detail to the description of the embodiments as illustrated in the drawings, wherein like reference numbers indicate like parts throughout the several views.

Structural health monitoring is an inspection need for any structure in service. Carbon fiber reinforced polymer (CFRP) composites have the advantage that they do not need external sensors to monitor the structure in terms of electrical measurements. Instead, the carbon fibers are the sensors inside the CFRP structures. Due to the processing of such composite, there is a rich resin layer formed on the external surface of the structure to be monitored. The monitoring is done by bonding electrodes on the surface of the structure where such electrodes should feature low resistivity, as well as high robustness and reproducibility.

Techniques based on changes in electrical properties (i.e. electrical resistance or impedance methods) offer fast and low-cost methods that are suitable for offline or online inspection of CFRP composites. Electrical impedance tomography (EIT) can be non-invasive and used for in-situ and real-time monitoring of structural integrity in terms of electrical impedance. Unlike other classical methods, such as optical fiber grating, ultrasonic, acoustic emission, and modal analysis, EIT does not need highly sensitive external sensors and/or actuators or costly equipment.

One of the main components of an EIT system is the electrode array which acts as an interface between the external hardware and the structure. To monitor structural health, a constant current can be supplied through a set of electrodes and then electric potentials can be collected from subsequent pairs of electrodes. Variations in electric potential profiles obtained from the two measurement cycles can be used to reconstruct the corresponding variation of conductivity in the domain of interest. The obtained conductivity image can then be used to assess the type and extent of local damage in the tested volume provided the relationships between the damage level and the (generally anisotropic) local change in conductivity are known. This task can be accomplished through the solution of an inverse problem and the corresponding relationships. It follows that the outcome of the reconstruction process depends on the robustness of the system and the accuracy of the data which, in turn, rely on the quality of the interface between the electrical hardware (e.g., the electrodes) and the structure being monitored.

A high-quality electrode should possess the following characteristics: (i) the interfacial bonding should be strong and uniform; (ii) the contact impedance should be low; (iii) the electrode material should be highly conductive; (iv) the durability of the electrode should be long term, i.e. the electrode should not debond with time/load so that the electrical resistance of the interface can be considered low, uniform and stable over the time; (v) the fabrication steps should be easy to reproduce; and (vi) the coupling of the electrode to the laminate should not induce any damage or create a hot spot in the structure. Additional factors that have implications that may be important, in terms of both processing and practice, include the electrode's low cost and easy mass production with minimal manual intervention. Here, electrodes used for EIT of composite laminates can be obtained in four main steps: (1) surface preparation, (2) bonding of the electrode to the structure, (3) electrical wiring and (4) coating with an insulating and protective material.

Surface preparation and bonding are the most important steps. Surface preparation involves removal of the surface resin to expose the conductive carbon fibers to which the highly conductive electrode material will be bonded. This step is important because the main conducting elements in a CFRP composite are often the carbon fibers, which are connected to the electrodes. Materials commonly used in electrodes include silver paste, copper, carbon cement or graphite, and several routines have been devised to apply the electrodes to the target surface, including electroplating, painting, sputtering and printing. Copper electroplating can have high repeatability and durability but the method needs uniform removal of the surface resin. Indeed, weaker adhesion forces often develop at the copper/resin interface, which can lead to debonding and malfunctioning. Moreover, since the current flows only through the carbon fibers that are in contact with the electrode, large zones of unpolished surface resin can lead to non-homogeneous current flow through the material. Proper surface preparation can improve the quality of the output from the electrodes.

Surface preparation is usually accomplished by sanding, which involves manual removal of the resin layer through the use of several grades of sand paper. The limitations of sanding include that it is a manual technique that is dependent on the operator and which leads to non-repeatable results. In addition, it is also time consuming and may induce damage on the exposed surface of the laminate. Therefore, alternative techniques may be used to overcome these limitations. From this standpoint, pulsed laser irradiation can be a very effective surface modification technique for a variety of materials. For instance, it can be used to improve adhesion between metals and epoxy resin, but may also be used for precision material cutting and/or drilling on a variety of materials including composites.

With carefully selected processing parameters (e.g., laser wavelength, average power delivered by the laser beam, pulse duration and frequency, laser scanning speed), laser irradiation can be used to remove material through photochemical (photolytic) or photothermal (pyrolytic) processes or a combination of both. In photochemical ablation, the bond excitation above a certain limit induces material dissociation. This process is characteristic of lasers with short wavelengths, such as UV lasers. At longer wavelengths, the applied energy is not high enough to induce the photolytic process and hence is absorbed into the material as vibrational energy or heat. When the temperature reaches the vaporization temperature of the material, the material evaporates or sublimates. Extensive surface modifications occur when the applied energy reaches a certain threshold, which depends on the target material as well as the selected laser processing parameters. In the case of CFRP, the properties of the primary constituents vary dramatically. The laser's parameters thus can be carefully tuned to selectively remove the polymer matrix with little or no fiber damage.

Laser irradiation can be used in place of sanding, in the preparation of high-quality electrodes for EIT. In particular, suitable laser processing parameters can be identified that allow the selective removal of surface resin with negligible fiber damage. The quality of the electrodes prepared using laser irradiation and sanding can be compared in terms of electrode/substrate contact resistance. A short review of EIT and electrical monitoring of CFRP is provided in this disclosure, followed by experimental investigations including the protocols to fabricate and test the different types of electrodes. The results include both a detailed morphological analysis of the surface (to assess the removal of the resin from the prepared surface) and an evaluation of the electrical resistance of the tested electrodes.

Three methods may be used for CFRP composite characterization: electrical resistance change method (ERCM), electrical impedance spectroscopy (EIS) and electrical impedance tomography (EIT). The electrical resistance change in carbon fiber reinforced polymers (CFRP) is useful in monitoring damage initiation. Many researchers have utilized the electrical resistance change method to detect damage in CFRP composites. ERCM applies a DC or AC current with constant amplitude at a particular frequency and measures the surface potential to calculate the resistance of the material using four electrodes. Referring to FIG. 1A, shown is a schematic representation of the electrical resistance change method for CFRP composite characterization.

Figure 1B:
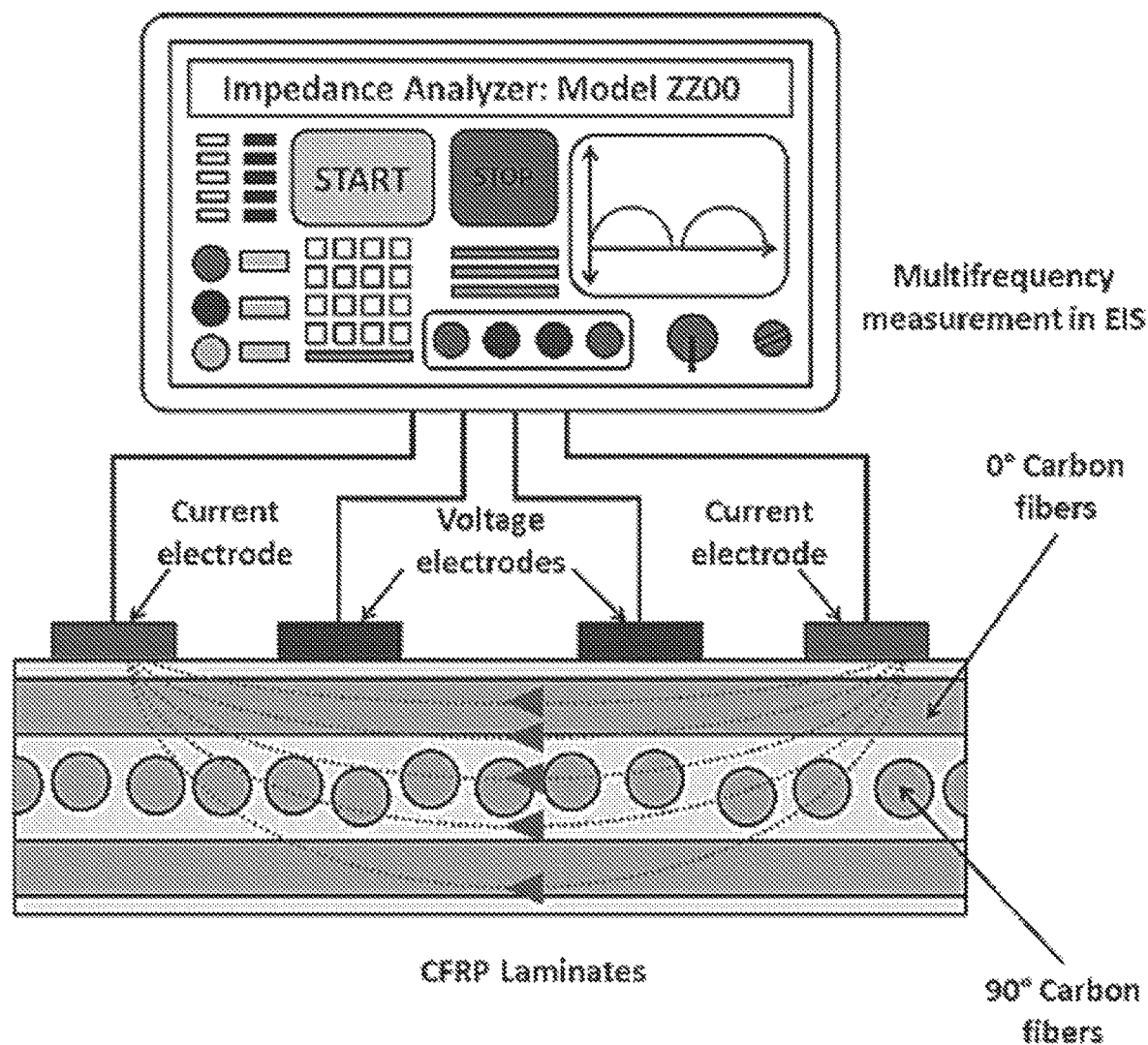

Electrical impedance spectroscopy (EIS) measures electrical impedance of the CFRP part from the voltage-current data collected at the object boundary at different signal frequencies (f). Referring to FIG. 1B, a schematic diagram of the impedance measurement in electrical impedance spectroscopy (EIS) is shown. A constant amplitude sinusoidal electrical current is injected at different frequencies to identify the change in frequency of the impedance (Z) of the sample. EIS has been used in noninvasive material characterization of different composite materials including fiber-reinforced polymers. EIS has also been found to be useful in monitoring the cure of plastics during their manufacturing process. CFRP composites have been characterized by EIS.

Figure 2:
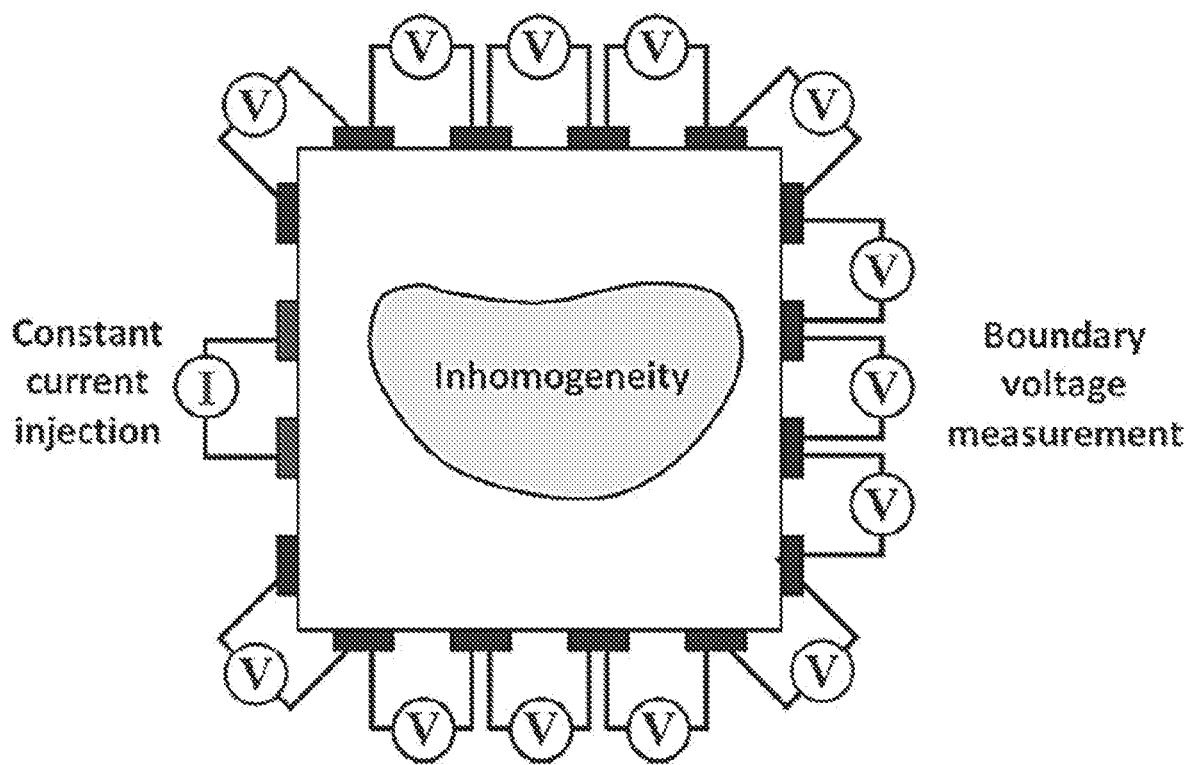
FIG. 2 is a schematic diagram illustrating an example of electrical impedance tomography (EIT) for composite characterization, in accordance with various embodiments of the present disclosure.

Electrical impedance tomography (EIT) is a computed tomographic technique that provides 2D or 3D reconstructions of the spatial distribution of the electrical properties of a domain ($\Omega$). It relies on voltage-current data measured at the domain boundary ($\partial\Omega$), which is mapped by an array of electrodes. Referring to FIG. 2, shown is a schematic diagram of boundary data collection in electrical impedance tomography (EIT). EIT is a low-cost, non-invasive and non-ionizing imaging technique. It has been used in medical diagnosis, industrial process tomography, civil engineering, geotechnology, material engineering, and biotechnology.

In ERCM, EIS and EIT, voltage-current data are used to obtain the resistance or impedance parameters of the composite structure, and hence an array of sensors or electrodes is placed on the material's surface to create an interface between the material and the instrumentation system. Because CFRP materials are composed of conducting carbon fibers embedded in an insulating resin, the placement of electrodes on a CFRP surface is not only a difficult task but it also plays a significant role in the accuracy of the measurements, the quality of the data and all final results. Here, an electrode fabrication method that facilitates the placement and connection of the electrodes on CFRP composite materials in ERCM, EIS, EIT or any other resistance (or impedance) analyzing techniques is disclosed.

Fabrication of Composite Laminates.

Laminates were obtained from carbon fiber prepregs made of a toughened epoxy resin supplied by Hexcel Composites (HexPly M21/35%/268/T700GC). The resin and fiber densities were 1.28 g/cm$^3$ and 1.80 g/cm$^3$, respectively, and the nominal fiber volume fraction was 56.9%. Unidirectional ([0]$_8$) and cross-ply laminates ([0°/90°]$_{2s}$) were fabricated by compression molding of the prepreg sheets. The following curing cycle was used during fabrication: (1) a full vacuum at 1 bar was applied to the whole stack to avoid air entrapment and the formation of voids; (2) a 7 bar gauge pressure was then applied through a hydraulic hot press machine (e.g., Laboratory Press 15T, PEI France) at 180° C. for 120 minutes; and (3) the laminate was cooled down at 2° C./min intervals. The obtained composite laminates were used as substrates for the parametric study of the effects of laser processing parameters and for electrical contact resistance measurements.

Surface Pretreatment.

Laser irradiation was carried out using, e.g., a ytterbium (Yb) fiber laser (1064 nm wavelength) through a PLS6MW multi-wavelength laser platform (e.g., Universal Laser Systems, USA). The main processing parameters of the system were:

laser maximum average power ($P_{ave}$) of 30 W;
pulse frequency (f) of 30 kHz;
pulse duration ($\tau_p$)≥10 ns;
minimum line spacing (p) of 30 µm;
maximum scanning speed (v) of 500 mm/s; and
focused beam diameter ($d_s$) of 25 µm.

The pulse fluence ($F_p$) that was transmitted to the target surface can be obtained as a function of the main processing parameters:

$$F_p = I_p \cdot \tau_p = \frac{P_{ave}}{fA_s}, \qquad (1)$$

where $I_p$ is the pulse irradiance and $A_s$ is the effective focal spot area.

Figure 3A:
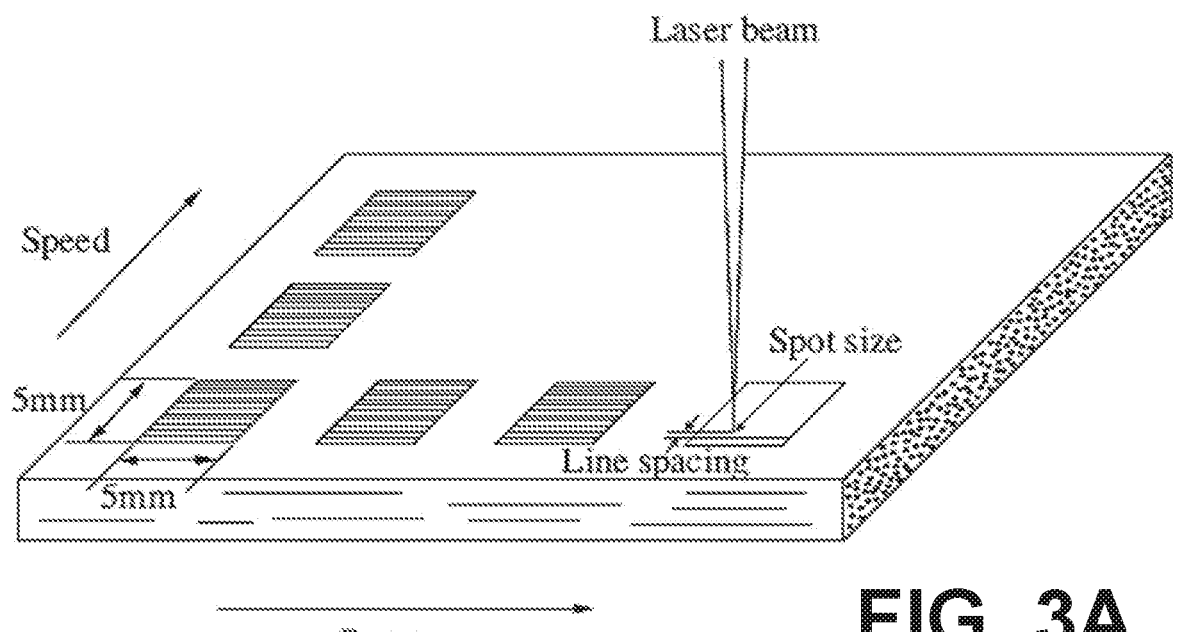
FIGS. 3A and 3B illustrate preparation and characterization of a surface of a carbon fiber reinforced polymer (CFRP) composite, in accordance with various embodiments of the present disclosure.
Figure 3B:
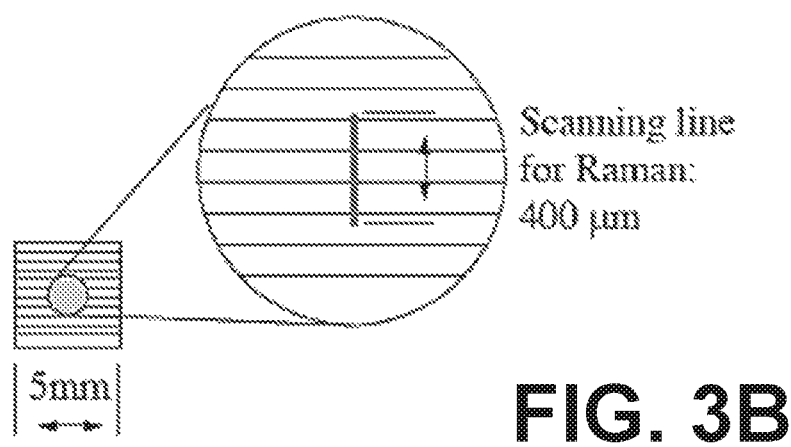

In the subsequent experiments, selected values of the average power and laser scanning speed were specified as percentages of the maximum values allowed by the system. To finely tune the laser irradiation, the power was varied within 15%-25% of the maximum average power by steps of 2.5% while the laser speed was varied between 10%-20% of the maximum speed by steps of 1%. This range was narrowed based on the results of preliminary experiments carried out in wider power and speed ranges. For this parametric study, (5 mm×5 mm) square arrays were processed on a cross-ply substrate by varying the laser's power and speed, giving rise to fifty-five combinations of ($P_{ave}$, V). Referring to FIG. 3A, shown is a schematic depiction of the electrode array employed to probe the different laser processing configurations. FIG. 3B illustrates the location of the Raman survey line for each processed surface. These preliminary tests were used to select the optimal combination of laser processing parameters in the fiber direction to achieve uniform surface resin removal and limited fiber damage. Subsequently, these laser parameters were replicated onto 5 mm×20 mm rectangular areas allocated for electrode fabrication.

For comparison, the sanding procedure outlined in "Durability Estimates of Copper Plated Electrodes for Self-sensing CFRP Composites" by A. Todoroki et al. (Journal of Solid Mechanics and Materials Engineering 4, pp. 610-620, 2010) was followed. In particular, 5 mm×20 mm areas were delimited using surface masking with vinyl tape. Note that contrary to laser preparation, precise control of the treated area was not possible, and for this reason masking was carried out beforehand. The areas were then treated with two grades of sand paper (e.g., SiC-paper grit 320 and 1000, Struers). The sanding was carried out parallel to the fibers direction. A few drops of concentrated sulfuric acid (97%) were then applied to complete the process, followed by extensive cleaning with distilled water and acetone.

Survey of Surface Morphology and Chemistry.

The quality of the processed surfaces was analyzed using optical microscopy (OM) on a stereomicroscope (e.g., Leica S6D, Germany). In addition, a high-resolution scanning electron microscope (SEM) was used to analyze the surfaces (e.g., FEI Quanta 200). The cross-sections of treated samples were studied with an optical microscope (e.g., Leica DM2500 M, Germany). To prepare the cross-sections, samples were embedded in epoxy resin (e.g., EpoFix, Struers) and, after curing, they were cut and polished to enhance imaging.

Since optical and scanning microscopy deliver only qualitative assessments of the treated surfaces, Raman spectroscopy was also used to complement the surface analysis with information concerning the chemical composition. A Raman spectrometer (e.g., LabRAM Aramis, Horiba Scientific Ltd) was used to probe the samples in the range of 1000-1700 $cm^{-1}$. A diode-pumped solid-state (DPSS) laser with a wavelength of 785 nm was used as the excitation source (low photon energy was needed to avoid excessive fluorescence of the resin). The laser power on the sample surface was fixed at 0.07 mW to avoid the heating effects on the sample. A 50× long work distance lens with a numerical aperture (N.A.) of 0.5 was used to focus the laser and collect scattered light. The exposure time on single spot was 100 s.

Figure 4A:
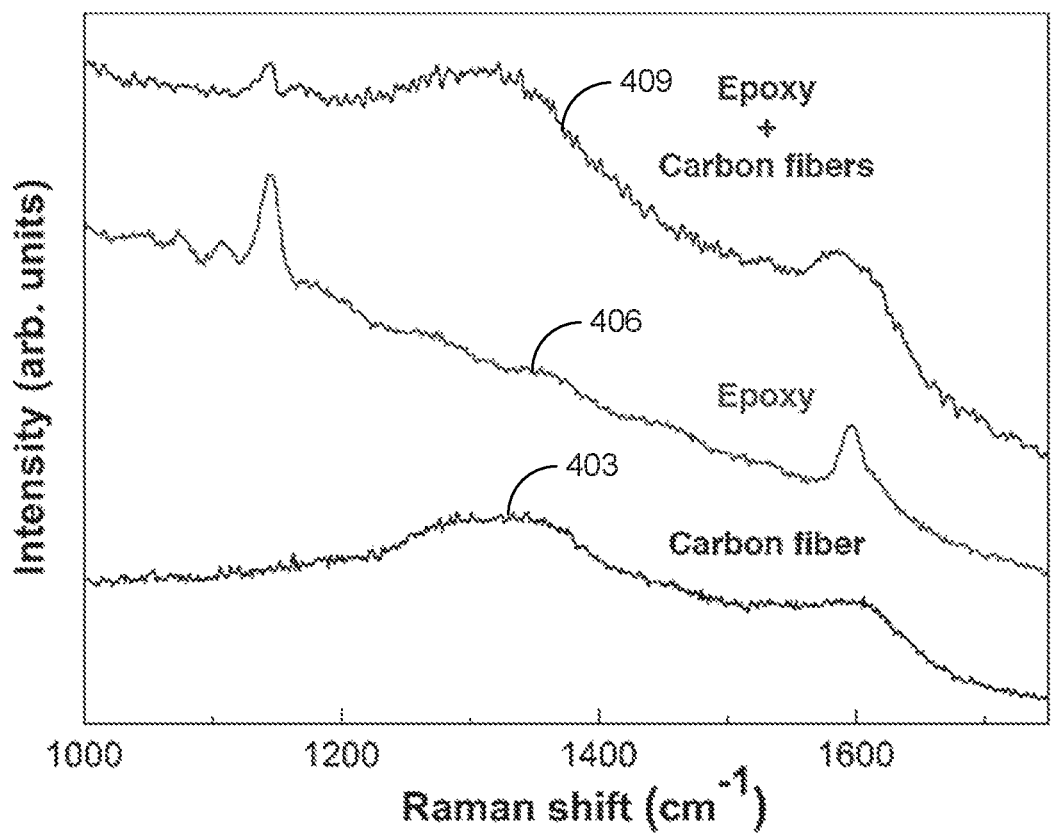
FIGS. 4A and 4B are plots illustrating examples of Raman spectra and line scans of various substrate surfaces, in accordance with various embodiments of the present disclosure.

Referring to FIG. 4A, shown is a plot of an example of Raman spectra of carbon fiber (curve 403), epoxy (curve 406) and epoxy+carbon fibers (curve 409). As shown in FIG. 4A, pure epoxy is characterized by two peaks at around 1147 $cm^{-1}$ and 1585 $cm^{-1}$. Similarly, carbon fiber is characterized by two broad bands at 1330 $cm^{-1}$ and 1610 $cm^{-1}$. The presence of carbon and epoxy together is indicated by three distinct peaks, which combine the peaks of pure carbon fiber and epoxy (1147 $cm^{-1}$, 1330 $cm^{-1}$ and 1610 $cm^{-1}$). Depending on the location and number of peaks, a spot is classified into three categories: pure carbon fiber, pure epoxy or a mix of the two. The Raman scanning was carried out perpendicular to the fibers over a line with a length of 400 μm.

Figure 4B:
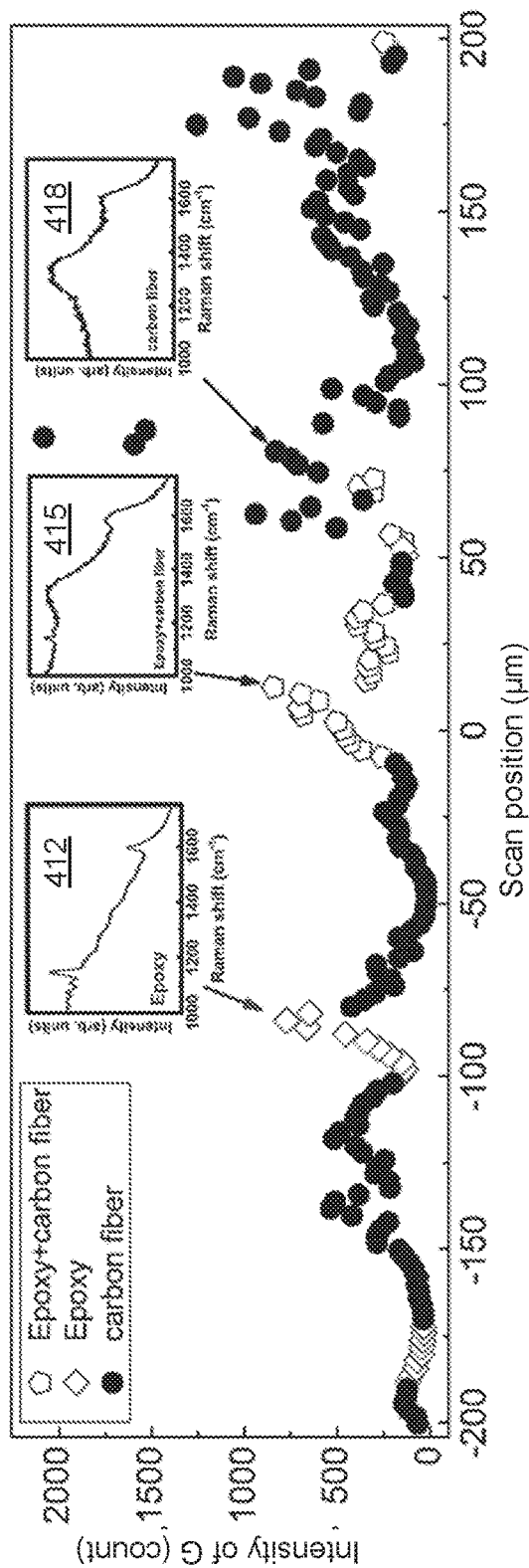

The samples were mounted on a 3D automatic stage for the line-scan Raman measurements. The stage was displaced automatically along the selected line on the sample surface while the spectrometer recorded the Raman spectrum for each collection point. Each collection point had a spot size of 2 μm in diameter and the sample stage moved 2 μm, thereby resulting in 200 acquisition points along the selected scanning line. Raman scanning provides quantitative results about the surface quality in terms of fiber exposure. FIG. 4B shows the line scan and the corresponding Raman spectrum of each point of epoxy (412), epoxy+carbon fibers (415), and carbon fiber (418).

Electrode Fabrication.

Figure 5:
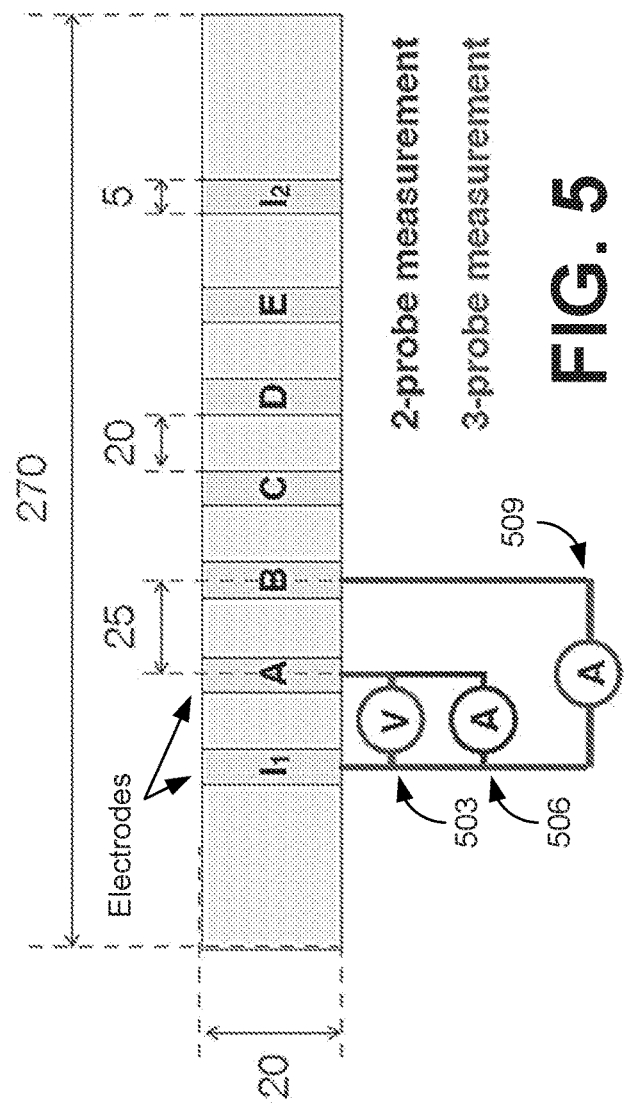
FIG. 5 illustrates two-probe and the three-probe methods for electrical measurements of prepared CFRP surfaces, in accordance with various embodiments of the present disclosure.

To analyze the contact resistance, six unidirectional composite laminates (270 mm×20 mm×2 mm) were prepared. Three samples were surface treated using laser irradiation while the remaining three samples were manually sanded. In both cases, the targeted areas for electrode placement were 5 mm×20 mm while the spacing between the center points of the areas was 25 mm. FIG. 5 shows an example of a configuration of the electrodes on an 8-ply unidirectional (UD) laminate with a schematic of the two-probe and the three-probe methods. Sets of electrodes were fabricated by three different techniques: (i) copper electroplating (ii) copper electroplating with a seed layer and (iii) silver paste.

Copper Electroplating.

Copper electroplating was performed on the treated surfaces by mainly following the procedures outlined in "Durability Estimates of Copper Plated Electrodes for Self-sensing CFRP Composites" by A. Todoroki et al. (Journal of Solid Mechanics and Materials Engineering 4, pp. 610-620, 2010) with the main difference the surface preparation method. The substrate surfaces were delineated using vinyl tape such that only the areas allocated for electrode placement (5 mm×20 mm) were exposed. The taped samples were placed in a copper sulfate ($Cu_2SO_4$) solution along with a copper plate. A low current density (0.66 $A/dm^2$) was then supplied for 120 minutes to obtain an initial uniform thin copper layer over the targeted areas. After that, lead wires were bonded to the copper layer with a conductive epoxy adhesive (e.g., ITW Chemtronics, USA). After the adhesive was cured, the sample was again placed in the copper sulfate solution and a higher current density (6 $A/dm^2$) was applied for 90 minutes to fully cover the wires. In this way it was possible to avoid the occurrence of thermal stresses induced by soldering. As a final step, the tape was removed from the sample and a non-conductive epoxy adhesive was applied to cover the electrodes to protect them from environmental conditions and potential damage induced during sample handling.

Copper Electroplating with a Seed Layer.

To improve the growth of the electroplated copper, Todoroki et al. ("Durability Estimates of Copper Plated Electrodes for Self-sensing CFRP Composites," Journal of Solid Mechanics and Materials Engineering 4, pp. 610-620, 2010) used silver paste as a seed layer. Here, copper was used as the seed layer through copper deposition of two samples. The samples were covered with a vinyl tape to expose only the areas targeted for the deposition. Afterward, a 1-μm layer of copper was deposited for 50 minutes using an e-beam evaporator (e.g., Denton Vacuum Inc., USA). The tape was then removed, and new tape was applied for the copper electroplating process during which low current density and high current density baths were used.

Silver Paste.

The procedure used to make electrodes using silver paste (e.g., Electron Microscopy Sciences, USA) was carried out as follows. Surface-treated substrates were masked with vinyl tape and then silver paste was applied to the unmasked locations for electrode fabrication. Wires were then bonded to the silver paste by means of a conductive epoxy adhesive. After the adhesive was cured, the mask was removed and the sample was cleaned with acetone. Finally, following the same procedure as the earlier samples, the electrodes were covered with a protective layer of standard epoxy resin.

Measurements of Electrical Contact Resistance.

During the electrical measurements, an alternating current of 450 Hz and 30 mA was supplied while the impedance was measured using a LCR meter (e.g., Agilent-E4980A Precision LCR meter). Since the phase angle was negligible, the measured impedance was considered to be equal to the electrical resistance. The electrical resistance measurements were carried out using two-probe and three-probe methods to evaluate the electrical contact resistance of the electrodes.

In the two-probe method shown in FIG. 5, the electrical potential (V) was measured via voltage sensor 503 between the same electrodes where the current (A) was injected via current source 506. This was done between the electrode ($I_1$) and the following electrodes (A, B, C, D and E).

In the three-probe method shown in FIG. 5, the electrical potential (V) was measured via voltage sensor 503 between two electrodes (e.g., $I_1$ and A) while the current (A) was injected at two electrodes including one common electrode and another electrode (e.g., $I_1$ and B) via current source 509. Similarly for the next electrical potential measurement between ($I_1$ and B), the current injection was at ($I_1$ and C) and so on. To evaluate the electrical contact resistance of the electrodes (A-E), the electrical potential of the three-probe measurement was subtracted from that of the two-probe measurement for the same pair of electrodes.

Assessment of Modifications in the Surface Morphology.

Figure 6:
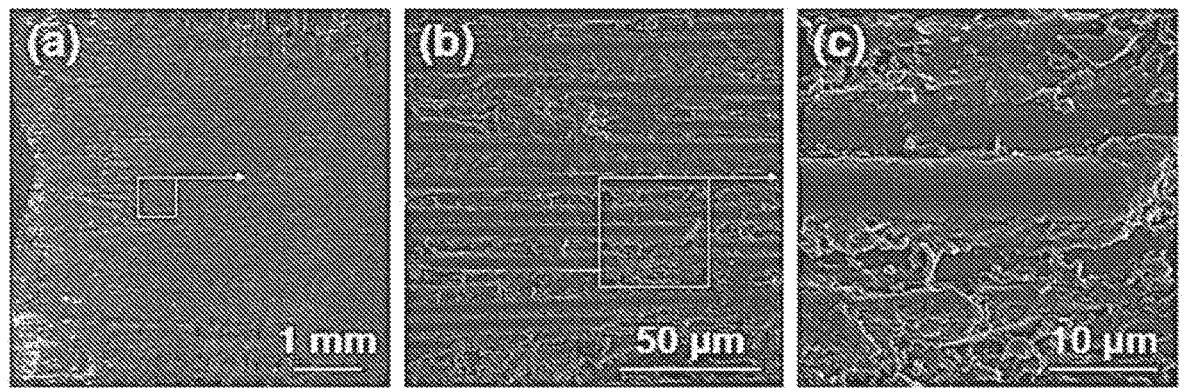
FIG. 6 includes images of a sanded surface, in accordance with various embodiments of the present disclosure.

FIG. 6(a) shows an optical microscopy image (40× mag.) of a sanded surface and FIGS. 6(b) and 6(c) show SEM images of the indicated portions of the sanded surface. The optical and SEM images of sanded surfaces, which are shown in FIGS. 6(a) and (b) respectively, demonstrate the unevenness of the obtained surface. Indeed, epoxy residue can be observed around the edges of the treated area. This is because the quality of the surface finish cannot be guaranteed by a manual process. This is one of the main drawbacks of the sanding method as it suffers from operator-to-operator variability. The uneven finish in the indicated portion of FIG. 6(b) is highlighted by the SEM image in FIG. 6(c), which shows a significant amount of epoxy resin that was not removed from the surface, as well as surface fibers that were damaged during the process. Both drawbacks were systematically observed in all sanded surfaces.

Figure 7A:
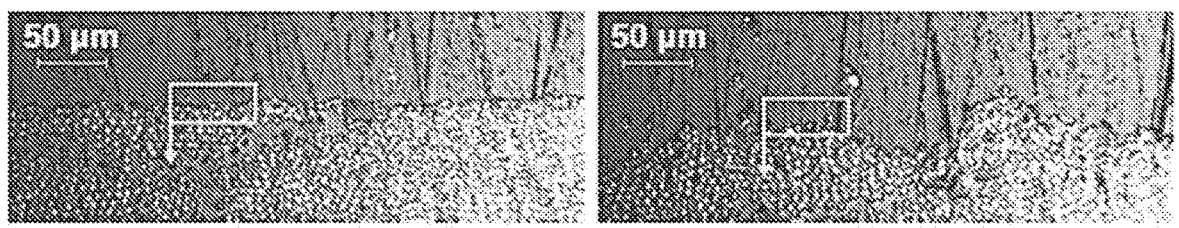
FIGS. 7A and 7B include images and graphical representations comparing sanded and laser-treated surface preparations, in accordance with various embodiments of the present disclosure.
Figure 7A:
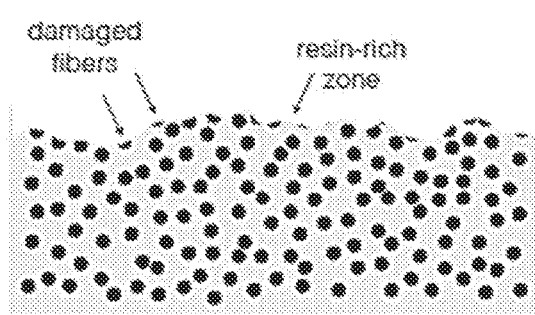
Figure 7B:
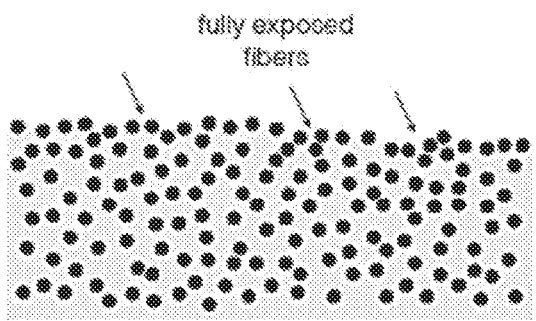

Referring now to FIG. 7A, shown is an image of an actual cross-sectional view of a sanded surface and a schematic representation of the indicated portion of the sanded surface. The schematic representation emphasizes the main attributes of the surface: the non-uniform removal of the surface resin and the induced fiber damage. For comparison, FIG. 7B shows an image of the actual cross-sectional view of a laser treated surface and a schematic representation of the indicated portion of the sanded surface. The schematic representation illustrates that the process was able to remove the resin effectively without producing the same fiber damage.

Figure 8A:
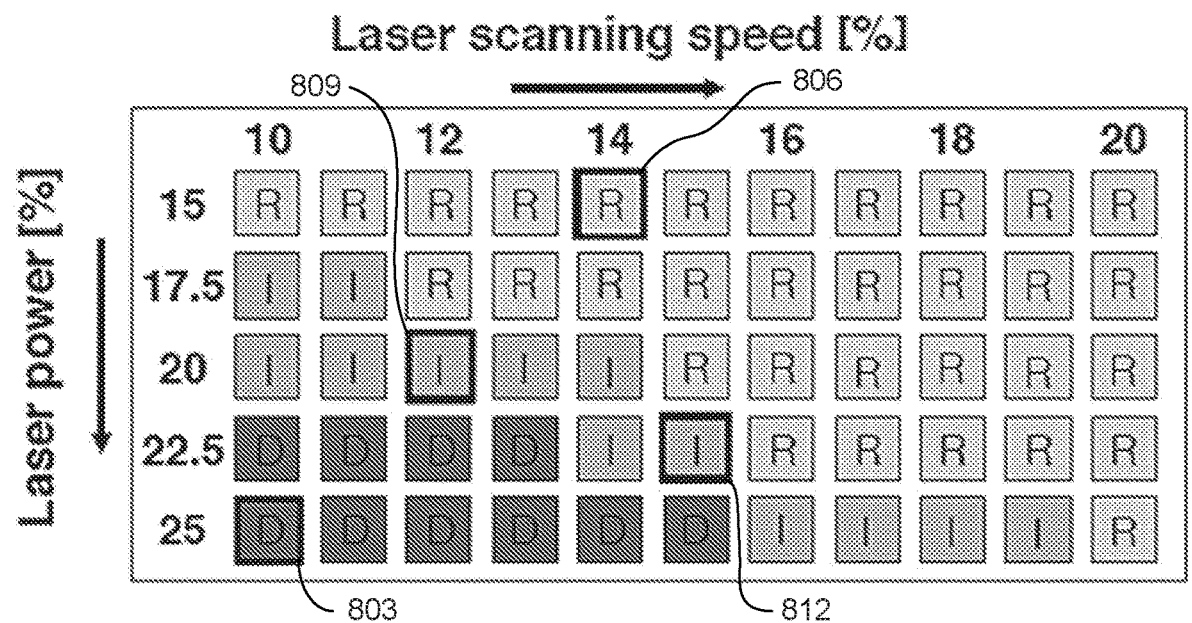
FIGS. 8A and 8B illustrate classifications of laser-treated surfaces in accordance with various embodiments of the present disclosure.
Figure 8B:
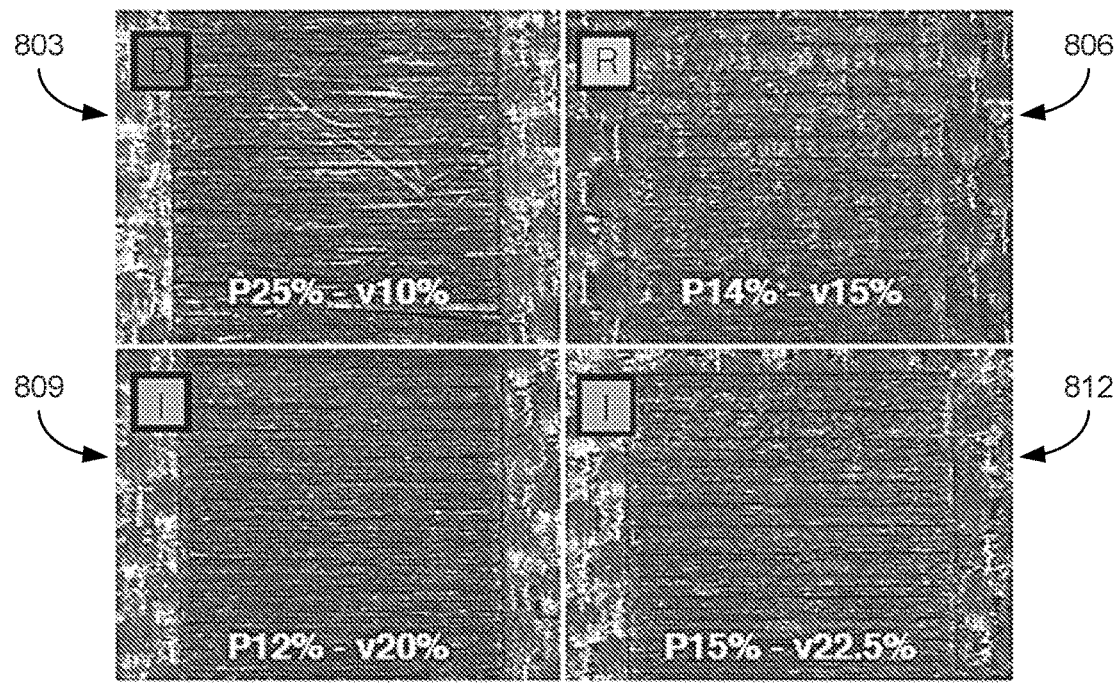

Referring next to FIGS. 8A and 8B, shown are a graphical representation of the various combinations of laser processing parameters along with optical microscopy observations of selected electrode surfaces that were treated with laser irradiation. Broad classifications of the electrode surfaces of FIG. 8A were determined based on optical pictures. The treated electrode surfaces are grouped into three categories with the following labels: "R" for surfaces with poor surface resin removal; "D" for surfaces with fiber damage; and "I" for surfaces with efficient resin removal. It is apparent from the classification pattern of FIG. 8A that higher laser power/frequency results in high incident energy into the material and that lower laser speed results in higher duration of the local interaction with the material. It follows that increased heat absorption leads to a high local temperature and fiber vaporization. It should be noted that when the surface of the CFRP is subjected to laser irradiation, the energy delivered to the surface is absorbed, thereby exciting the bonds and generating heat.

Since the carbon fibers are thermally more conductive than the polymer matrix, the absorbed heat conducts along the fibers, increasing the temperature locally along the direction of the fibers. Once the temperature reaches the vaporization temperature of the matrix, the matrix along the conduction path evaporates. This zone where the matrix loss occurs due to photo-thermal conduction is known as the heat-affected zone (HAZ). The size of the HAZ depends on the laser scanning speed, direction, power and frequency as these variables determine the energy absorbed into the material. FIG. 8B also shows four optical images (10× mag.) of samples taken from selected regions representative of the three categories. Image 803 from group "D" shows an example of a surface with fiber damage, image 806 from group "R" shows an example of a surface with poor resin removal, and images 809 and 812 show examples of surfaces with efficient resin removal.

Figure 9:
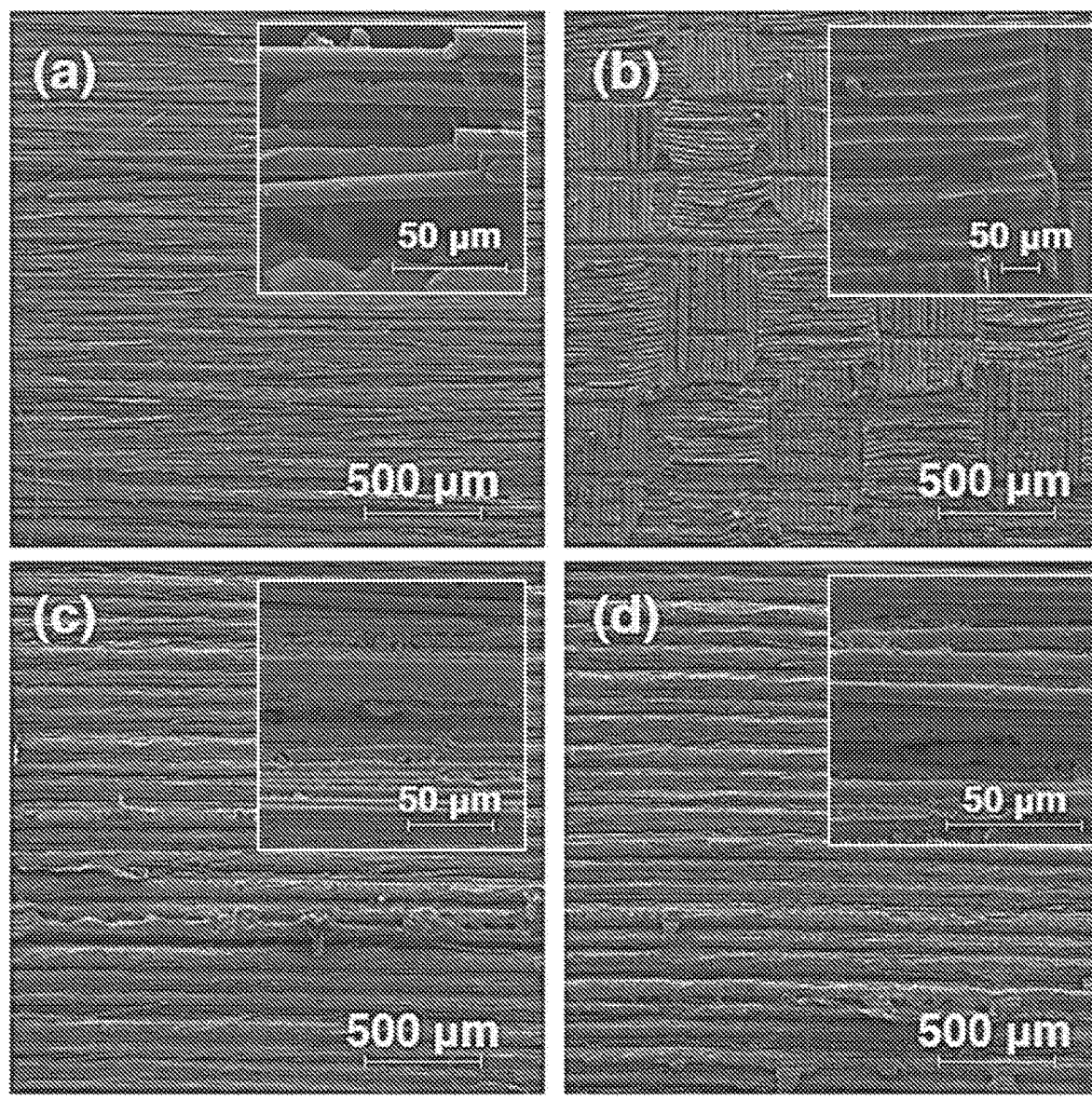
FIG. 9 includes high resolution images of examples of laser-treated surfaces according to the classifications given in FIGS. 8A and 8B, in accordance with various embodiments of the present disclosure.

FIG. 9 shows SEM images of the four samples from three categories with insets including magnified SEM images. FIG. 9(a) shows the surface with extensive fiber damage of image 803; FIG. 9(b) shows the surface with minimal surface resin removal of image 806; and FIGS. 9(c) and 9(d) show the surfaces with efficient resin removal of images 809 and 812, respectively. As can be seen, extensive fiber damage occurred in the samples that were exposed to either high laser power, slow laser speed or both. This is because at high power or at low speed, the amount of energy absorbed locally is high enough to induce fiber damage. Similarly, samples processed at high laser speeds or low laser power exhibit poor surface resin removal as the local energy density is not high enough for the surface removal to occur. The samples in the intermediate range exhibit effective resin removal with apparent minimal damage.

Referring back to FIGS. 7A and 7B, the cross-sectional views show that the electrode surface obtained as a result of laser irradiation is rougher than that obtained using sanding. High surface roughness is usually attributed to better interlocking with the electrode and can result in better adhesion between the two joining surfaces of the electrode and the laminate. Thus, laser irradiation can increase the durability of the contact between the electrode and laminate.

Analysis of the Surface Chemistry Using Raman Spectroscopy.

Figure 10:
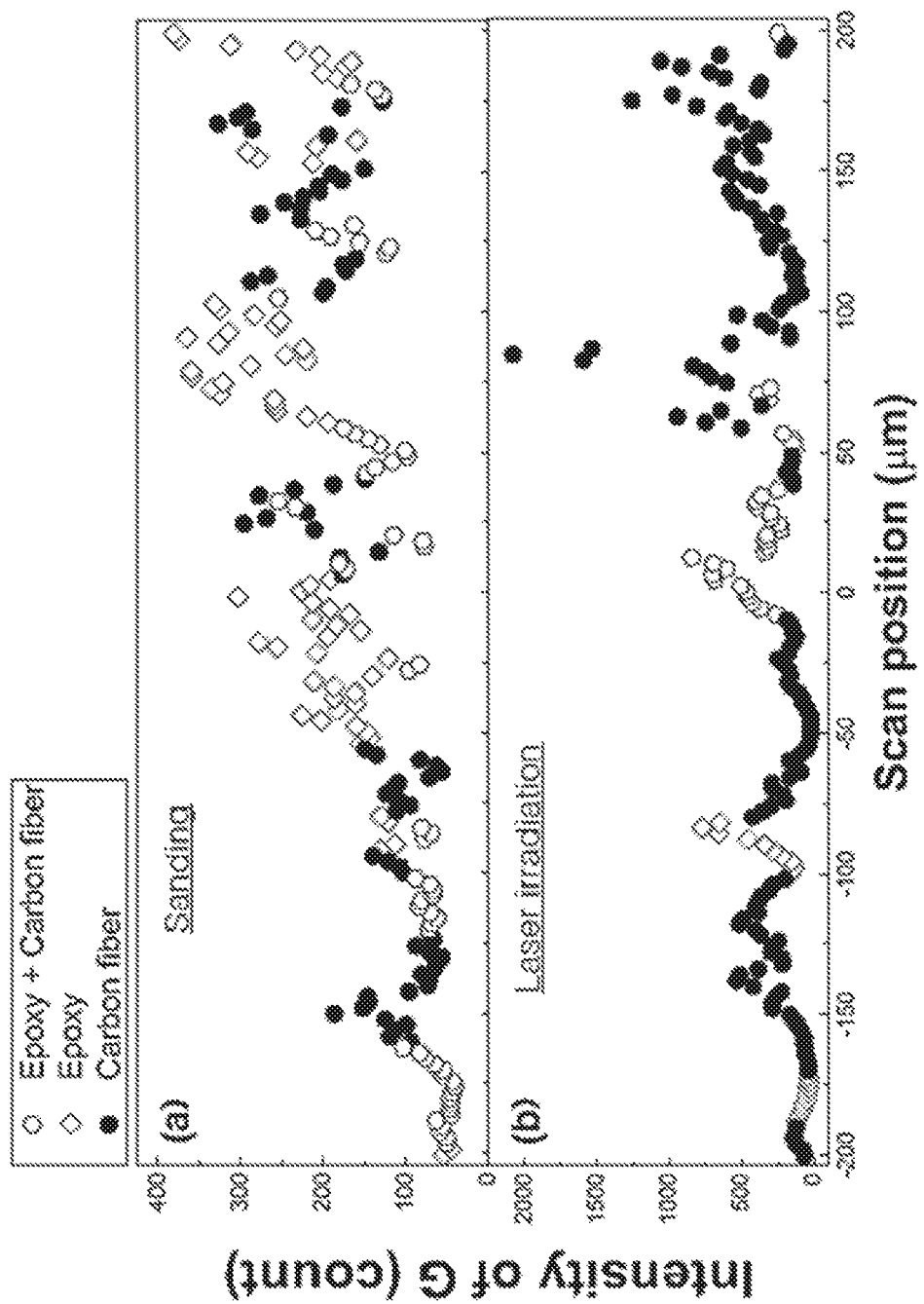
FIG. 10 includes plots illustrating examples of Raman imaging results from a sanded surface and a laser-treated surface, in accordance with various embodiments of the present disclosure.

FIG. 10 includes plots illustrating examples of Raman imaging results from a sanded surface and a laser-treated surface. A typical response recorded during Raman line scanning over a 400 µm line of a sanded sample is provided in FIG. 10(a). The intensity counts were distributed as follows: 25% for carbon fibers, 38.5% for pure epoxy and 36.5% for the combination of both. Analysis of these results demonstrated that with sanding, the percentage of fully exposed fibers is very low and that most of fibers are covered with a very thin layer of resin.

Raman line scanning was also carried out on the laser-treated samples from the three categories. Here, the results obtained from line scanning over a 400 µm line of the sample prepared at V=15% and $P_{ave}$=22.5% are shown in FIG. 10(b). Note that samples from category "I" exhibited similar results whereas results from category "R" exhibited a very low percentage of exposed fibers. The intensity counts were distributed as follows: 77.5% for fully exposed carbon fibers, 9% for pure epoxy and 13.5% for the combination of both. Therefore, a remarkable improvement in the percentage of fully exposed carbon fibers compared with sanded samples was achieved. There were still areas where the carbon fibers were not completely exposed, which is also captured in the SEM images of FIG. 9(d), but the percentage was very low in comparison to the number of fully exposed fibers. It is believed that the obtained fiber exposure is sufficient for the purposes of the study. Hence, the combination of the parameters in the intermediate range can be selected as the optimal range. For subsequent electrode fabrication, the combination of V=15% and P=22.5% was chosen.

Analysis of Electrical Contact Resistance.

Figure 11:
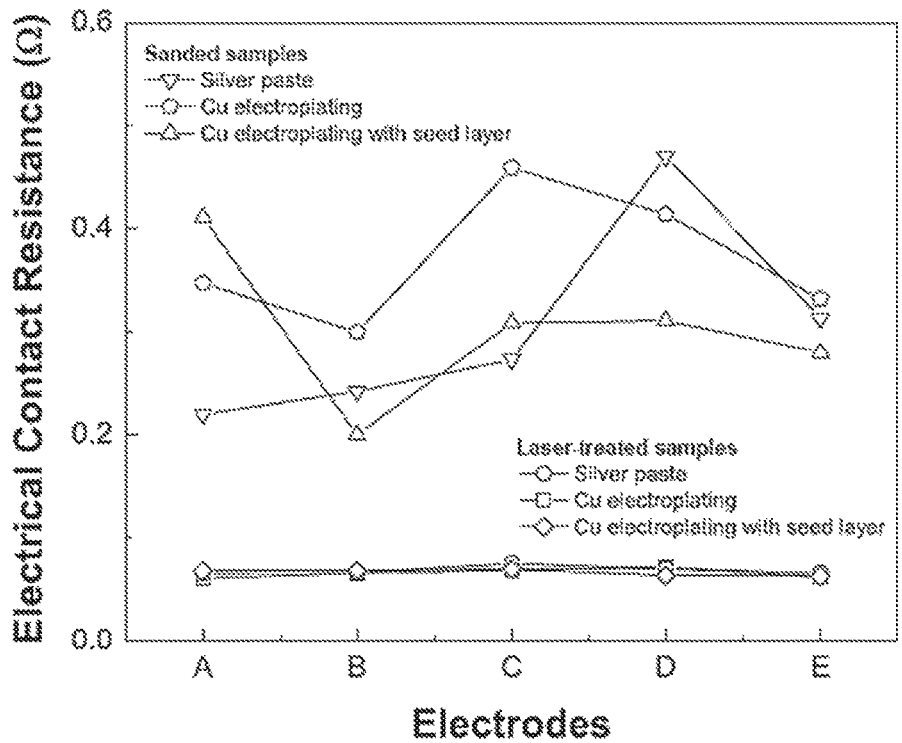
FIGS. 11 and 12 illustrate electrical contact resistance values of sanded and the laser-treated surfaces, in accordance with various embodiments of the present disclosure.
Figure 12:
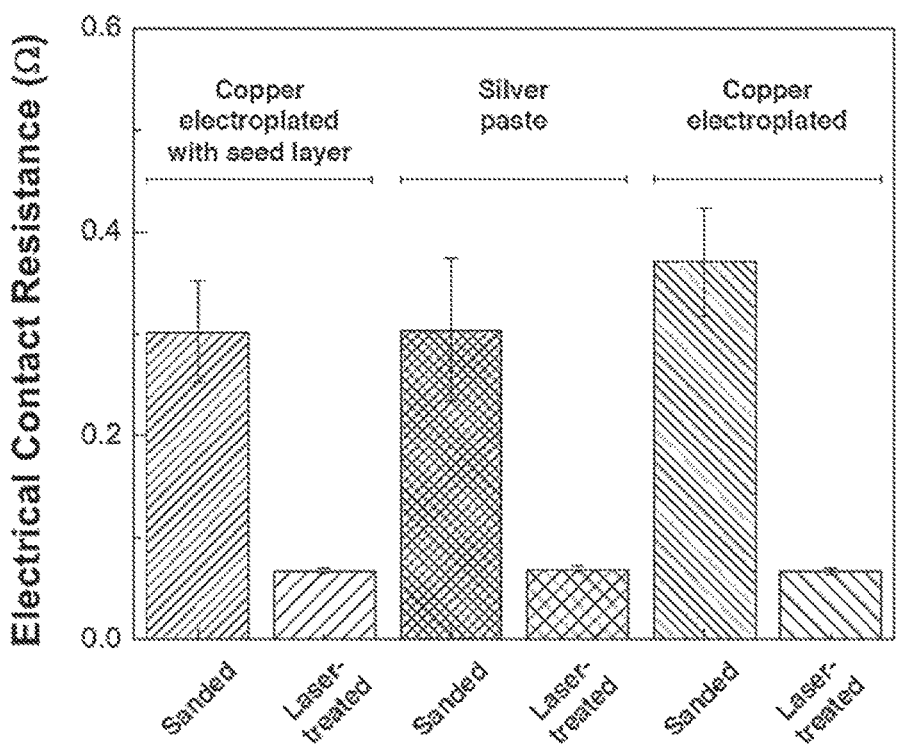

FIGS. 11 and 12 show electrical contact resistance values of the sanded samples and the laser-treated samples for different electrode materials, respectively. FIG. 11 illustrates the electrical contact resistance of the five inner electrodes in different electrode materials. The calculated electrical contact resistance of the five inner electrodes (A-E, marked in the abscissa of FIG. 11) was based on the difference between the two-probe and three-probe measurements. From the bar chart of FIG. 12, it can be seen that the electrical contact resistance of the sanded surfaces (average 0.325Ω) is about five times the electrical contact resistance of the laser-treated surfaces (average 0.067Ω). Also, FIG. 11 shows that the sanded samples exhibit large variations in the measured contact impedance (around ±0.06Ω) thereby indicating low repeatability. In comparison, FIG. 11 shows that the laser-treated samples exhibit high repeatability with a very low variation (around ±0.01Ω).

The sanded samples exhibited variations in the contact impedance depending on the electrode material used. These variations may be attributed to the inhomogeneity in the sanded samples. However, the laser-treated samples exhibited little variation in terms of the electrode material. These results suggest that the contact impedance mainly depends on the method of surface preparation and is independent of the electrode material. This is advantageous as silver paste is superior in terms of scalability, ease of processing and cost when compared to copper plating. Thus, silver paste can be used instead of copper electroplating to prepare the electrodes. Although the durability was not studied, it is believed that the surface roughness obtained through laser irradiation provides improved interlocking and hence greater durability irrespective of the electrode material used.

Electrodes are a key component of any EIT system and as such they should feature low resistivity as well as high robustness and reproducibility. Here, a processing technique for surface preparation of composite laminates based on the use of pulsed laser irradiation has been presented. In particular, the effect of various laser processing parameters on the morphology of the surfaces was examined. In turn, the processing parameters that result in selective removal of the electrically insulating resin with minimum surface fiber damage were identified. Proper laser parameters with minimal surface fiber damage were obtained. The surfaces were characterized using microscopic imaging, SEM and Raman spectrum mapping. The results showed that the electrical contact resistance of the sanded samples (average 0.325Ω) is about five times the electrical contact resistance of the laser-treated surfaces (average 0.067Ω). All the electrode materials had very low and almost the same electrical contact resistance measurements in the laser-treated samples. Quantitative analysis of the electrical contact resistance were compared with those obtained using sanding. The variation in electrical contact resistance measurements of the laser-treated samples was very low when compared with that of the sanded samples.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for bonding an electrode to a carbon fiber reinforced polymer (CFRP), the method comprising:
    selecting an average power $P_{ave}$ and a scanning speed v of a laser system;
    preparing a pretreated target area on the carbon fiber reinforced polymer (CFRP) composite surface by using laser pulsed irradiation from the laser system so that at least 75% of carbon fibers of the CFRP composite are exposed;
    forming an electrode directly to the exposed carbon fibers in the pretreated target area; and
    bonding lead wires to the electrode with a conductive epoxy adhesive,
    wherein the average power $P_{ave}$ and the scanning speed v of the laser system are selected to achieve the at least 75% exposed carbon fibers.

2. The method of claim 1, wherein the electrode includes a silver paste and a copper layer.

3. The method of claim 1, wherein the electrode has a contact resistance of 0.1 ohms or less.

4. The method of claim 1, wherein the electrode exhibits a uniform bonding over the pretreated target area.

5. The method of claim 1, comprising:
    preparing a plurality of pretreatment target areas on the CFRP composite surface using laser pulsed irradiation; and
    bonding a plurality of electrodes to corresponding ones of the plurality of pretreatment target areas.

6. The method of claim 1, wherein the at least 75% exposed carbon fibers in the pretreated target area of the CRFP composite are fully exposed by the laser pulsed irradiation.

7. The method of claim 6, wherein exposure of the carbon fibers is evaluated using Raman mapping of the pretreated target area.

8. The method of claim 1, wherein the electrode is mechanically interlocked with fully exposed fibers in the pretreated target area during bonding.

9. The method of claim 1, wherein forming the electrode comprises applying silver paste to the pretreated target area.

10. A method for monitoring a structural health of a carbon fiber reinforced polymer (CFRP) composite, the method comprising:

positioning the CFRP composite for pretreatment of a target area of a CFRP surface;

selecting an average power $P_{ave}$ and a scanning speed v of a laser system;

preparing the pretreated target area by irradiation with a pulsed laser beam along a series of paths in the target area, wherein the pulsed laser beam is generated by the laser system so that at least 75% of carbon fibers of the CFRP composite are exposed; and forming an array of electrodes directly to the exposed carbon fibers in the pretreated target area;

measuring associated impedances of the array of electrodes at a domain boundary of a given domain of the CFRP composite; and reconstructing the given domain based on the measured impedances using a computed tomographic technique, for monitoring the structural health of the CFRP composite, wherein the average power $P_{ave}$ and the scanning speed v of the laser system are selected to achieve the at least 75% exposed carbon fibers.

11. The method of claim 10, wherein the series of paths are a plurality of parallel paths.

12. The method of claim 10, wherein the pulsed laser beam has a focused beam diameter ($d_s$) of 25 μm on the CFRP surface.

13. The method of claim 10, wherein the series of paths have a minimum line spacing (p) of 30 μm.

14. The method of claim 10, wherein the pulsed laser beam has a frequency (f) of 30 kHz and traverses the series of paths at the scanning speed (v) of less than or equal to 500 mm/second, and with the average power ($P_{ave}$) being less than or equal to 30 Watts.

15. The method of claim 14, wherein the scanning speed (v) is less than 100 mm/second and the average power ($P_{ave}$) of the laser is equal to or less than 7.5 Watts.

16. The method of claim 14, wherein the scanning speed (v) is equal to or greater than 50 mm/second and the average power ($P_{ave}$) of the laser is greater than 4.5 Watts.

17. The method of claim 16, wherein the average power ($P_{ave}$) of the laser is greater than 6.75 Watts when the scanning speed (v) is greater than 75 mm/second and the average power ($P_{ave}$) of the laser is equal to or less than 6.75 Watts when the scanning speed (v) is equal to or less than 75 mm/second.

18. The method of claim 16, wherein the average power ($P_{ave}$) of the laser is greater than 5.25 Watts when the scanning speed (v) is equal to or greater than 60 mm/second.

19. The method of claim 10, wherein a pulse duration ($\tau_p$) of the pulsed laser is greater or equal to 10 nanoseconds.

\* \* \* \* \*